United States Patent [19]
Zeigler

[11] Patent Number: 5,900,156
[45] Date of Patent: May 4, 1999

[54] ULTRASONIC LOADING CONTROL FOR CENTRIFUGE BASKET

[75] Inventor: Dwayne Zeigler, Port Wentworth, Ga.

[73] Assignee: Savannah Foods and Industries, Savannah, Ga.

[21] Appl. No.: 08/868,920

[22] Filed: Jun. 4, 1997

[51] Int. Cl.⁶ .......................... B01D 17/038; B01D 17/12; G01N 9/24
[52] U.S. Cl. .............................. 210/744; 73/622; 73/629; 210/86; 210/360.1; 210/781; 127/19; 127/56
[58] Field of Search ........................... 210/85, 86, 360.1, 210/739, 744, 781, 380.1, 787; 162/198, 263; 73/364, 627, 629, 631, 632, 634, 643, 620–622; 422/72; 494/1, 10, 16; 127/19, 56

[56] References Cited

U.S. PATENT DOCUMENTS

| | | | |
|---|---|---|---|
| 2,713,263 | 7/1955 | Turner | 73/627 |
| 2,751,783 | 6/1956 | Erdman | 73/364 |
| 3,420,374 | 1/1969 | Umeda | 210/86 |
| 4,228,530 | 10/1980 | Bergey . | |
| 5,254,241 | 10/1993 | Bange et al. | 210/86 |
| 5,562,823 | 10/1996 | Reeves | 210/380.1 |
| 5,601,704 | 2/1997 | Salem et al. | 210/86 |

Primary Examiner—Joseph W. Drodge
Attorney, Agent, or Firm—Pillsbury Madison & Sutro, LLP

[57] ABSTRACT

A loading control system for a centrifuge used in, for example, a sugar refining operation, optimizes the introduction of product to be centrifuged. A loading system has an ultrasonic loading probe, a sound tube for delivering the sound signals to the sugar wall and returning to the ultrasonic probe, an analog controllable feed valve and a programmable logic controller which is used to control the operation. The logic program implements a control loop which analyses the signal from the probe and controls the position of the gate accordingly. Preferably, the system also implements a control loop for automatic adjustment of the flow rate and amount of sugar in the machine in order to optimize the loading process.

24 Claims, 6 Drawing Sheets

ULTRASONIC LOADING CONTROL FOR CENTRIFUGE BASKET

BACKGROUND OF THE INVENTION

Reservation of Copyright

The disclosure of this patent document contains material which is subject to copyright protection. The copyright owner has no objection to the facsimile reproduction by anyone of the patent document or the patent disclosure, as it appears in the U.S. Patent and Trademark Office patent files or records, but otherwise reserves all copyrights whatsoever.

Field of the Invention

This invention relates to the control of a centrifugal device, and, more particularly, to control of the loading of such a device using ultrasonic sensing.

Description of the Related Art

Centrifugal devices (centrifuges or centrifugals) are used in the refining of various substances such as sugar. In the refining process, centrifuges are typically used to separate particulate matter from a raw material. For example, in refining sugar and like substances, centrifuges are required to separate particulate sugar crystals from the syrup fraction of the massecuite, magma, or mother liquor that serves as the raw material in the refining process. They are also used to spin moisture from the crystallized sugar during a cleaning process.

Figure 1:
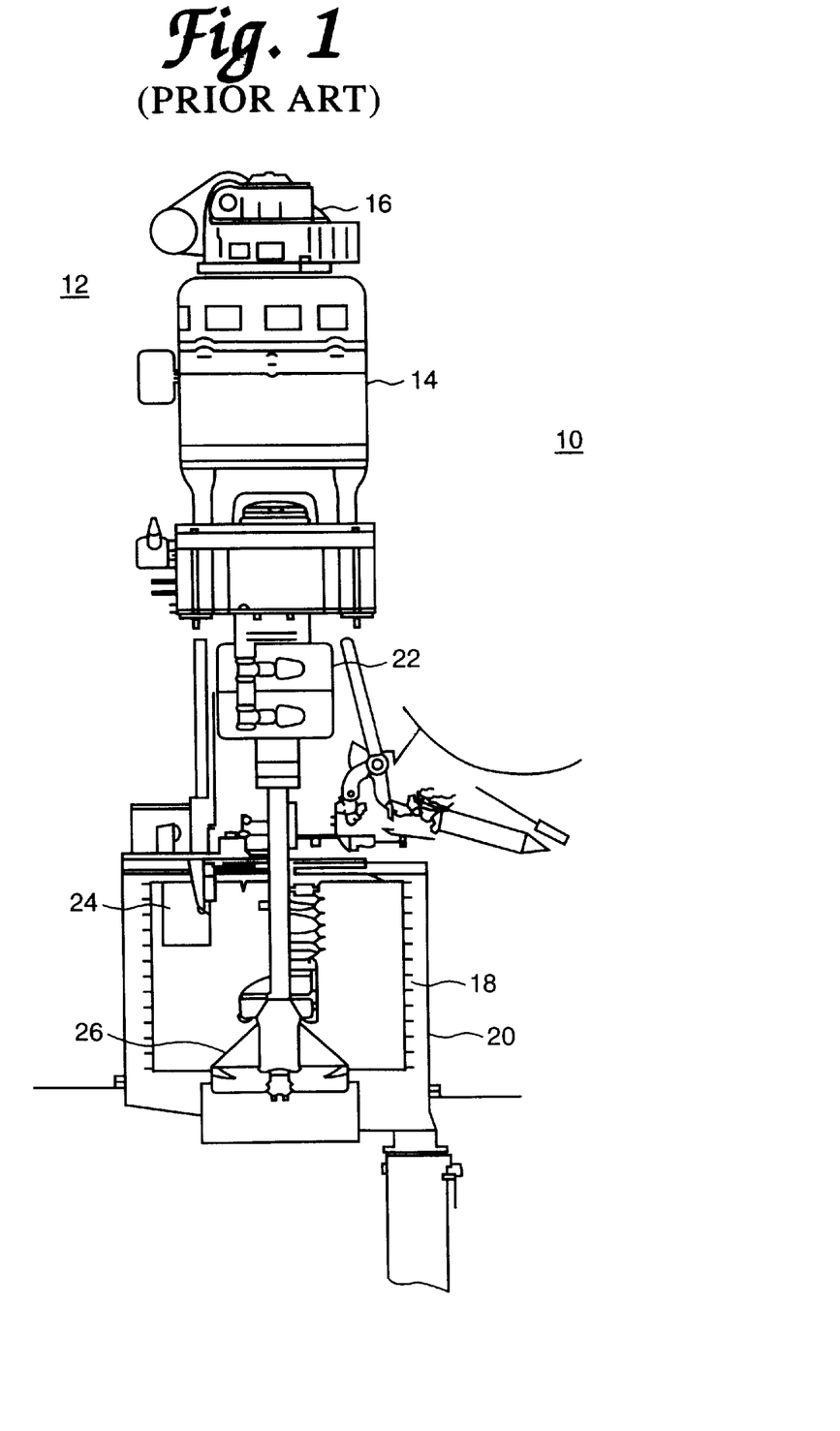
FIG. 1 is a cross-sectional view of a conventional affination or white sugar centrifuge.

The type of centrifugal device used in these applications generally is the filter or basket centrifuge as shown in FIG. 1. The centrifuge has a drive motor assembly 12 composed of a main drive motor 14 and a discharge drive motor 16 which drive a perforated basket 18 disposed in a housing or curb 20. The basket 18 is usually about four feet high and three feet in diameter. A single integrated motor may be used instead of the two separate motors 12, 14.

In operation, an amount of raw material (massecuite, magma, or mother liquor) is loaded into the basket 18 which is then spun around at high speed, driven by main drive motor 14. The desired particulate matter from the raw material collect around the sides of the basket 18, forming a film (or cake or wall) which increases in thickness as it is formed. Once the film reaches a particular thickness, it is then necessary to discontinue adding the raw material and to remove or further process that film.

For example, when used to separate impurities from the sugar product, the massecuite (the raw material) is loaded into the basket 18 until a desired amount of sugar has been loaded into the basket.

The indication as to whether this desired amount has been loaded (and as to whether the film around the inside of the basket 18 is thick enough) is generally given by some electromechanical sensing mechanism which confirms the end of filling. This electro-mechanical sensing mechanism is typically some type of mechanical arm which is physically pushed away from the wall, which, in turn, causes a limit switch to send a digital signal to resume the centrifugal cycle. The main drive motor 12 spins the basket 18 to cause liquid in the raw material (massecuite) to separate from the particles (sugar) due to centrifugal force. The screen of the basket 18 has apertures sufficiently small to retain particle crystals included in the mixture, but the impurities pass through the perforations in the basket 18 and are drained off at the bottom of the curb 20. The crystals accumulate on the screen and are held there by centrifugal force.

After the mixture has been separated, the basket 18 is spun down and some crystals adhere to the screen. These must be removed by a plow device 22 such as a knife or scraper that transits the screen surface of the basket 18 at a slow rotational speed when driven by the discharge motor 14. Once the crystals have been removed from the sides of the basket 18 by the plow 22, the central portion of the basket 18 is raised or lowered to permit the crystal product to pass through and to be collected for further processing.

In the case of sugar processing, one stage of the additional processing involves the drying of a sugar slurry. At this point, it is necessary to remove moisture from the slurry by centrifugal spinning. This process involves a similar use of the centrifuge 10 in which the slurry is introduced into the centrifugal basket 18 and excess moisture is spun out using the main drive motor 12. Then, the plow 22 is used to plow out the cake of dried sugar crystals formed during the spinning process while the basket 18 is driven by the discharge motor 14.

While this type of centrifugal system functions adequately, it has several disadvantages, not least of which is that mechanical devices require significant maintenance. The mechanical arm used to sense the thickness of the wall is normally linked to the loading gate so that the gate can be closed down to slow the introduction of raw material into the machine. This mechanical linkage is difficult both to calibrate and to maintain.

Figure 2:
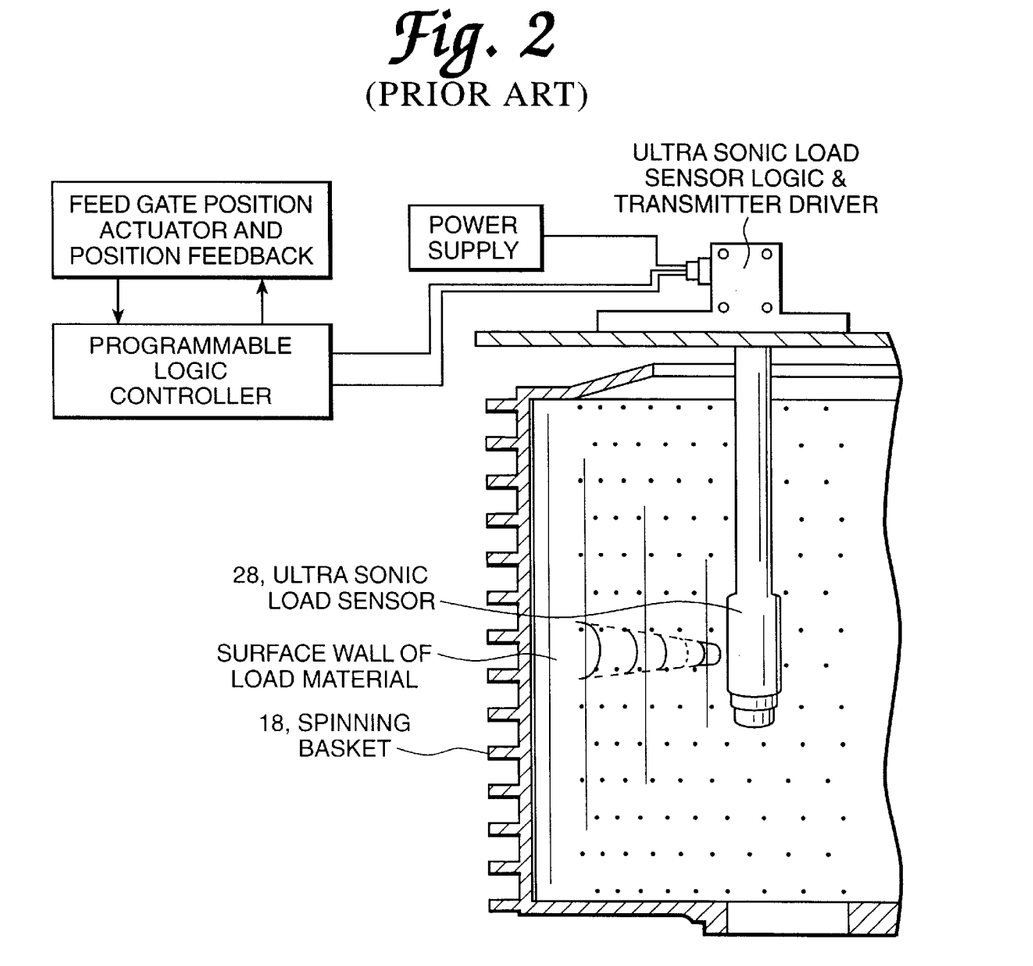
FIG. 2 depicts a conventional ultrasonic probe configuration.

There have been several attempts to use non-mechanical (i.e., pure electrical) mechanisms to determine the thickness of the wall. These include both capacitive and ultrasonic probes inserted in the basket 18. An example of such a probe is shown at 28 in FIG. 2. All probes in service today have all of the sensing devices inside the machine (e.g., in the basket 18). However, the machines typically operate at more than 1,400 r.p.m. which generally poses quite a threat to any object which may come in contact by being inside during the high speed operation. Further, they are all linked with a step gate positioning device which will open the gate to any one of a number (typically ten) of set positions. All of the electronic probes open the gate to one set position only plus one pinch position to limit the flow of the raw material into the basket during the final stages of the loading cycle. All of the current loading systems must be adjusted to accurately control the amount of raw material in the basket with any and all changes in the viscosity of the raw material solution being loaded.

SUMMARY OF THE INVENTION

It is desirable to provide a centrifuge loading system which will allow the loading of raw material into the basket of a centrifuge in the shortest amount of time while eliminating as much of the mechanical maintenance as possible.

Therefore, it is an object of this invention to provide a centrifuge loading system for centrifuges and the like which would accurately load a centrifuge while eliminating the need for expensive items being located inside the machine.

It is a further object of this invention to provide absolute analog control over the flow rate of the raw material into the machine using a sensing device which does not come into contact with the particulate substance.

It is a further object of this invention to produce a loading system which minimizes the amount of time required to load the centrifuge.

It is a further object of this invention to provide a loading system which is self-correcting for necessary adjustments to the loading cycle and which maintains a constant level of particulate (crystal) with each successive batch of raw material which is placed inside the basket.

It is a further object of this invention to provide a probe which may be adjusted along its radial plane as to allow the installer to maximize the return echo of the probe regardless of the condition of the top of the machine.

It is a further object of this invention to provide a mechanism for replacing the probe with a minimal amount of effort. The probe will be accessible from above with a sound carrying tube being a separate part from the actual probe to allow ease of replacement.

It is a further object of this invention to provide a control system which protects the operating personnel as well as the mechanical portion of the centrifuge in the event of power loss, air pressure loss, loss of echo or other failure of the machine. During such a failure the invention will conduct itself so as to prevent any personal damage to the operator or mechanical damage to the machine.

The above and other objects are achieved by using a loading control system which uses an ultrasonic level indicator mounted above the machine. The sound is sent to and reflected from the wall of particulate matter (sugar) through a tube which has a reflector mounted on the end which is mounted at an angle of about 45 degrees relative to the wall and the probe. The probe signal is then used to determine the proper position of the loading gate relative to the amount of raw material and particulate matter in the basket. This is an analog control system with an infinite number of possible positions. The position is held inversely proportional to the signal of the probe. This allows faster filling when the machine is empty and slower filling when the machine is full. After filling has been completed and the machine has increased speed, the loading time and actual amount of raw material and particulate matter in the basket are used to adjust the gate full open position and the basket full indication which will correct for overloading, under-loading or extended loading time. The mounting bracket is formed in two separate pieces allowing the sound carrying tube to be adjusted in the radial direction to allow the optimization of the return echo.

In the event of a failure, all of the analog signals will be read as zero and the gate is closed to prevent the introduction of any more raw material into the basket. The loading gate is equipped with air solenoid valves which prevent the gate from opening and force the gate closed in the event of a failure.

The probe is installed in the top of the sound carrying device to make it more accessible.

Accordingly, in one aspect this invention is a centrifuge including a basket disposed in a housing; means for loading a raw material into the basket; an ultrasonic probe disposed outside the housing and a sound tube. The ultrasonic probe produces an electronic signal for controlling the loading means. The sound tube is disposed in the basket and is connected to the ultrasonic probe for transmitting sound waves from the probe into the basket and for returning reflected sound waves back to the ultrasonic probe.

In another aspect, this invention is a device for controlling a flow rate of a raw material into a basket of a centrifuge. The device includes an ultrasonic probe and a sound tube. The ultrasonic probe is disposed outside a housing of the centrifuge and produces an electronic signal for controlling a loading means. The sound tube is disposed in the basket and connected to the ultrasonic probe for transmitting sound waves from the probe into the basket and for returning reflected sound waves back to the ultrasonic probe.

In some embodiments the sound tube has a reflector disposed on an end thereof, preferably mounted at an angle of about 45 degrees relative to a wall of the basket and the probe.

In some embodiments, the tube is adjustable in the radial plane so as to maximize a return signal by adjusting the angle at which the sound is reflected from a wall of particulate matter on the inside of the basket.

In yet another aspect, this invention is a method of extracting a particulate substance from a raw material using a centrifuge. The method includes: loading an amount of the raw material into a basket of the centrifuge; rotating the basket so that the particulate substance is extracted from the raw material to form a wall on an inside of the basket; determining a thickness of the wall using an ultrasonic probe disposed outside the basket and connected to a sound tube disposed inside the basket; and controlling the amount of raw material loaded into the basket based on the determined thickness of the wall.

In some embodiments the controlling of the amount of raw material includes controlling a loading gate of the centrifuge based on the determined thickness. Preferably the loading gate is controlled repeatedly. In some cases, the position of the loading gate is inversely proportional to the determined thickness.

In yet another aspect, this invention is a centrifuge device comprising: a basket disposed in a housing; a loading gate for loading a raw material into the basket; an ultrasonic probe disposed outside the housing and producing an electronic signal for controlling the loading means; a sound tube disposed in the basket and connected to the ultrasonic probe for transmitting sound waves from the probe into the basket and for returning reflected sound waves back to the ultrasonic probe; and a programmable logic controller (PLC). The PLC is programmed to effect determining a thickness of a wall formed in the basket using an ultrasonic probe disposed outside the basket and connected to a sound tube disposed inside the basket; and controlling the amount of raw material loaded into the basket based on the determined thickness of the wall.

In yet another aspect, this invention is a sound tube. The sound tube has a substantially cylindrical portion having one end connectable to an ultrasonic probe for transmitting sound waves from the probe and for reflecting sound waves back to the probe; and a reflector disposed on another end of the cylindrical portion. In some embodiments the reflector is mounted at an angle of about 45 degrees relative to the ultrasonic probe and a wall of which signals from the probe are to be reflected. In some embodiments, the sound tube is adjustable in the radial plane so as to maximize a return signal by adjusting the angle at which the sound is reflected from a wall off which signals from the probe are to be reflected.

BRIEF DESCRIPTION OF THE DRAWINGS

The above and other objects, features, and advantages of the present invention are further described in the detailed description which follows, with reference to the drawings by way of non-limiting exemplary embodiments of the present invention, wherein like reference numerals represent similar parts of the present invention throughout the several views and wherein.

DETAILED DESCRIPTION OF THE PRESENTLY PREFERRED EXEMPLARY EMBODIMENTS

Figure 3:
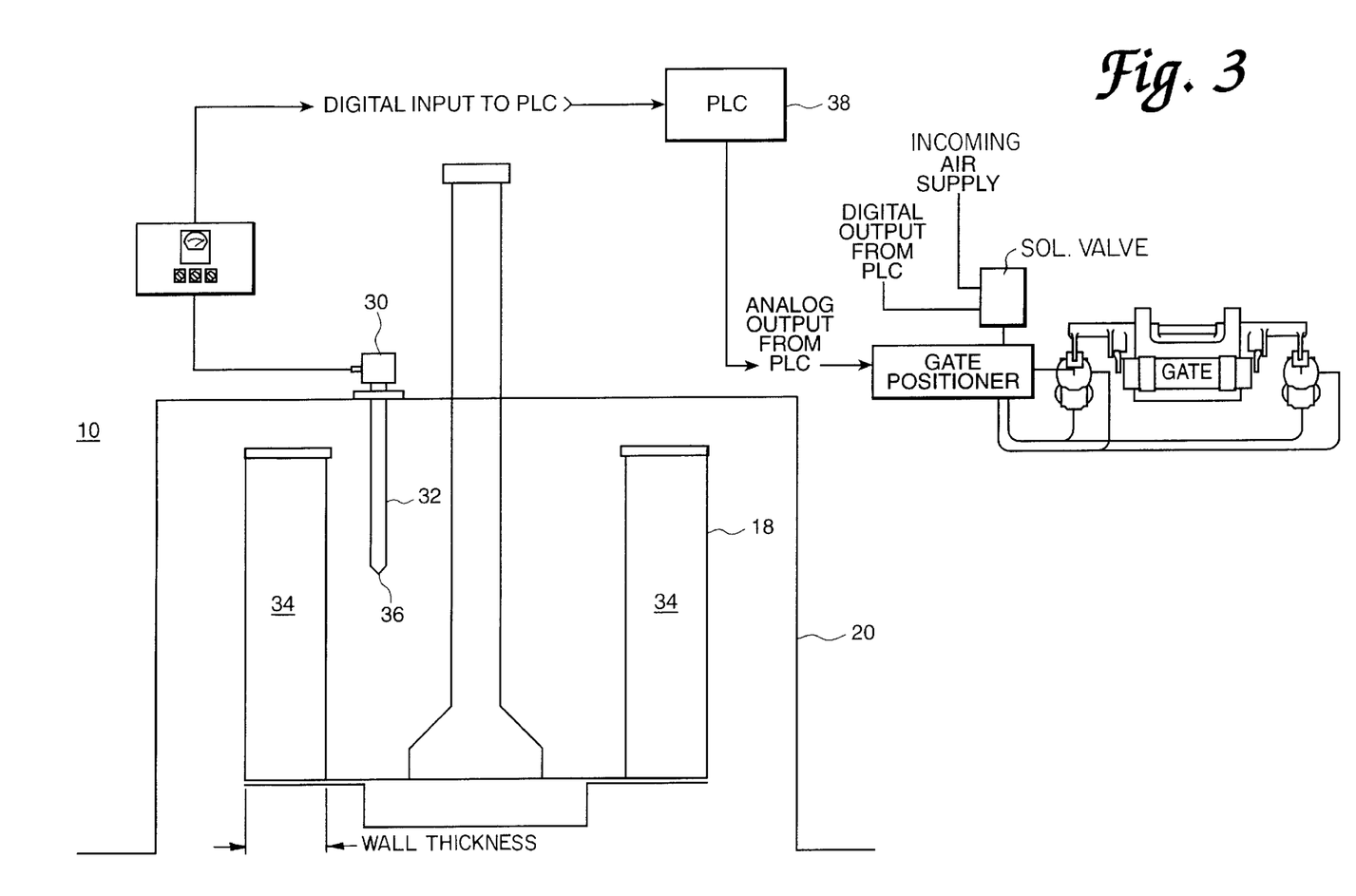
FIG. 3 shows the arrangement in a centrifuge of the sound carrying tube according to this invention.
Figure 4A:
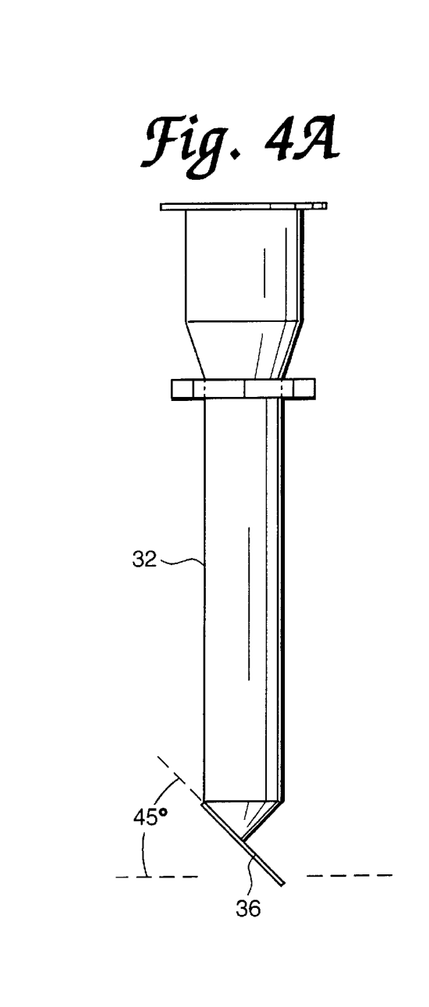
FIGS. 4A and 4B depict a preferred embodiment of the sound tube according to this invention.
Figure 4B:
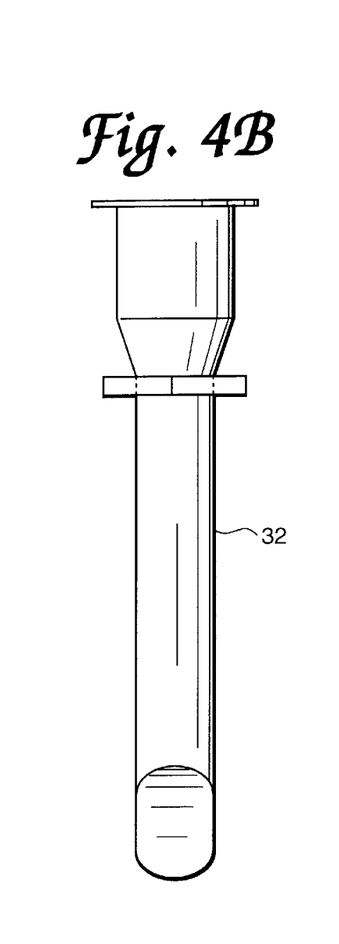
Figure 4C:
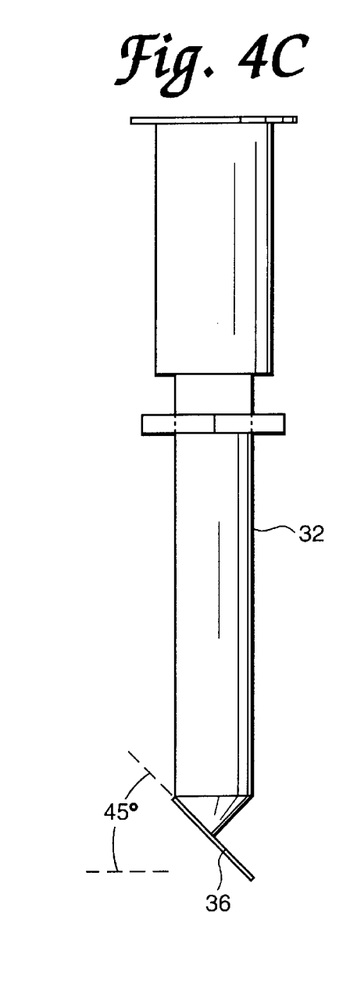
FIGS. 4C and 4D depict an alternative embodiment of the sound tube according to this invention.
Figure 4D:
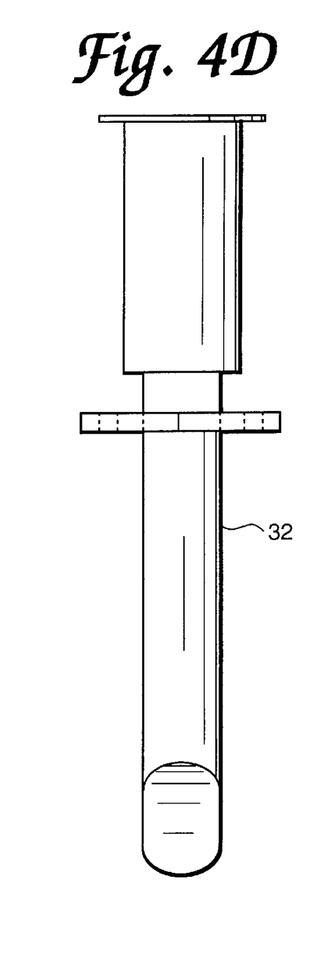
Figure 5:
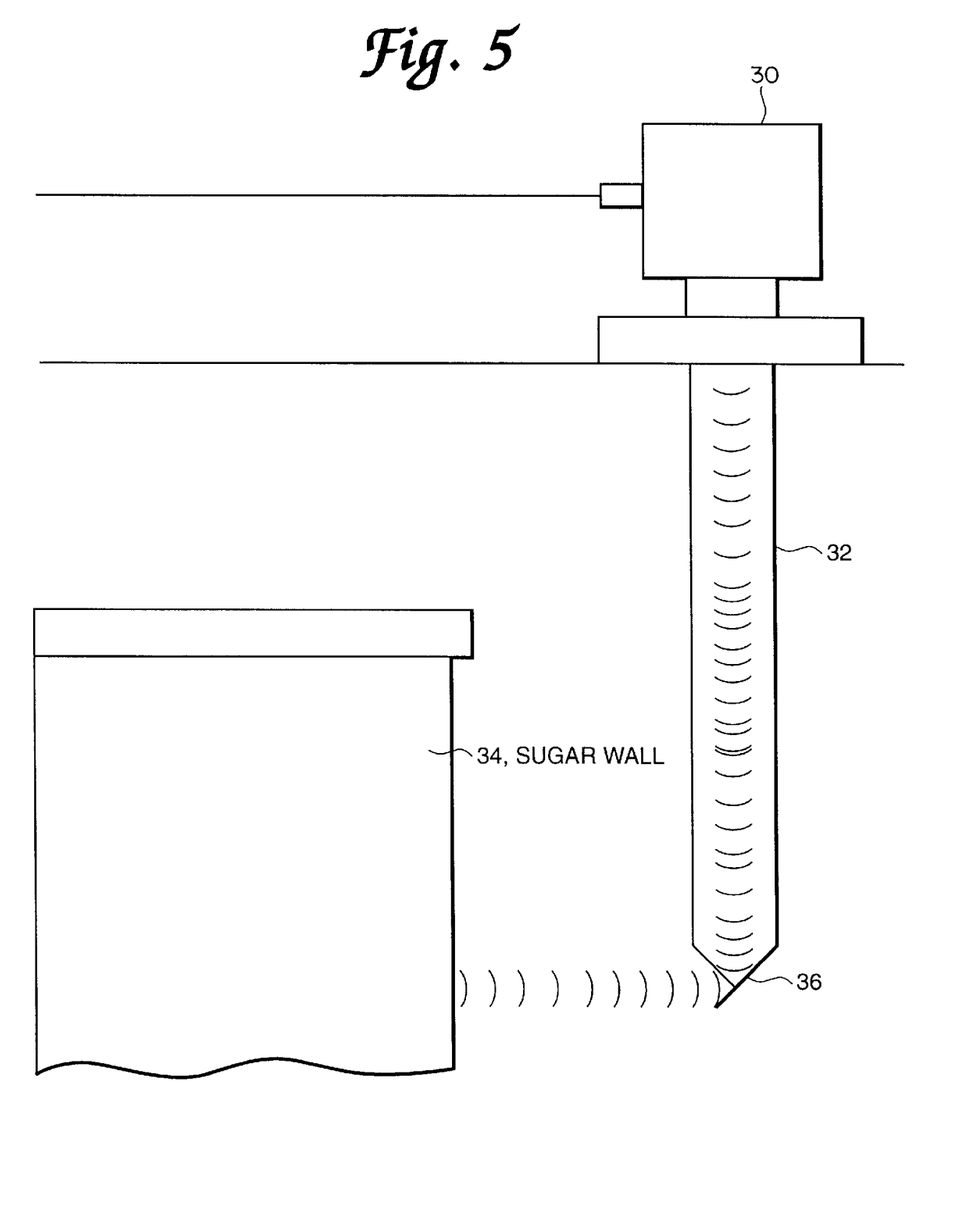
FIG. 5 depicts the path of sound waves through the sound carrying tube of the present invention.

With reference to FIGS. 3–5, an ultrasonic probe 30 is mounted on the outside of the machine housing 20 of a centrifuge 10. A sound tube 32 is connected to the ultrasonic probe 30 and is disposed inside the housing 20 in the basket 18. By placing the ultrasonic probe 30 outside the moving parts of the machine, that is, away from the volatile atmosphere of the interior of the machine, the probe is protected from possible damage, for example, from coming into contact with the particulate wall.

FIGS. 4A and 4B depict a preferred embodiment of the sound tube 32 according to this invention, and FIGS. 4C and 4D depict an alternative embodiment of the sound tube 32 according to this invention.

Sound (depicted as curved lines in FIG. 5) from the ultrasound probe 30 is sent to and reflected from the wall 34 of particulate matter (sugar) through the sound tube 32 which has a reflector 36 mounted on one end. The reflector 36 is mounted at an angle of about 45 degrees relative to the wall 34 and the probe 30.

In operation, the probe signal is used to determine the proper position of the loading gate relative to the amount of raw material and particulate matter in the basket.

The ultrasonic probe 30 produces as output an analog signal representing a thickness of the wall 34. This signal is input to a PLC 38 which is used to control the loading gate.

The signal from the PLC 38 is in the form of an analog signal which varies from 4 ma to 20 ma according to the amount of material (e.g., sugar) in the basket. The PLC then converts this signal to a percentage value accurate to within 0.01 percent. The PLC then calculates the gate open position by determining the rate at which the basket 18 is filling and then integrating at a set value (approximately 85%) to determine the rate at which the gate should close. This is important since the rate of filling dramatically changes with the consistency of the material (e.g., sugar) in the basket.

The actual gate position is thus set by the integral factor and a direct proportional factor (approximately 95%). These two factors allow the gate to close at a slower rate for the more viscous solutions while closing faster with the more fluid solutions.

The gate control evaluation by the PLC 38 is constrained by maximum and minimum open positions for the gate. In the preferred embodiment the minimum gate open position is preset in the PLC and is not adjustable by the operator. The maximum gate open position is set by an adjustment to the machine. This is necessary to allow the operator the ability to open fully the valve in order to clean it out. It also allows an operator to limit the opening of the valve when the material is in an abnormally fluid state.

Figure 6:
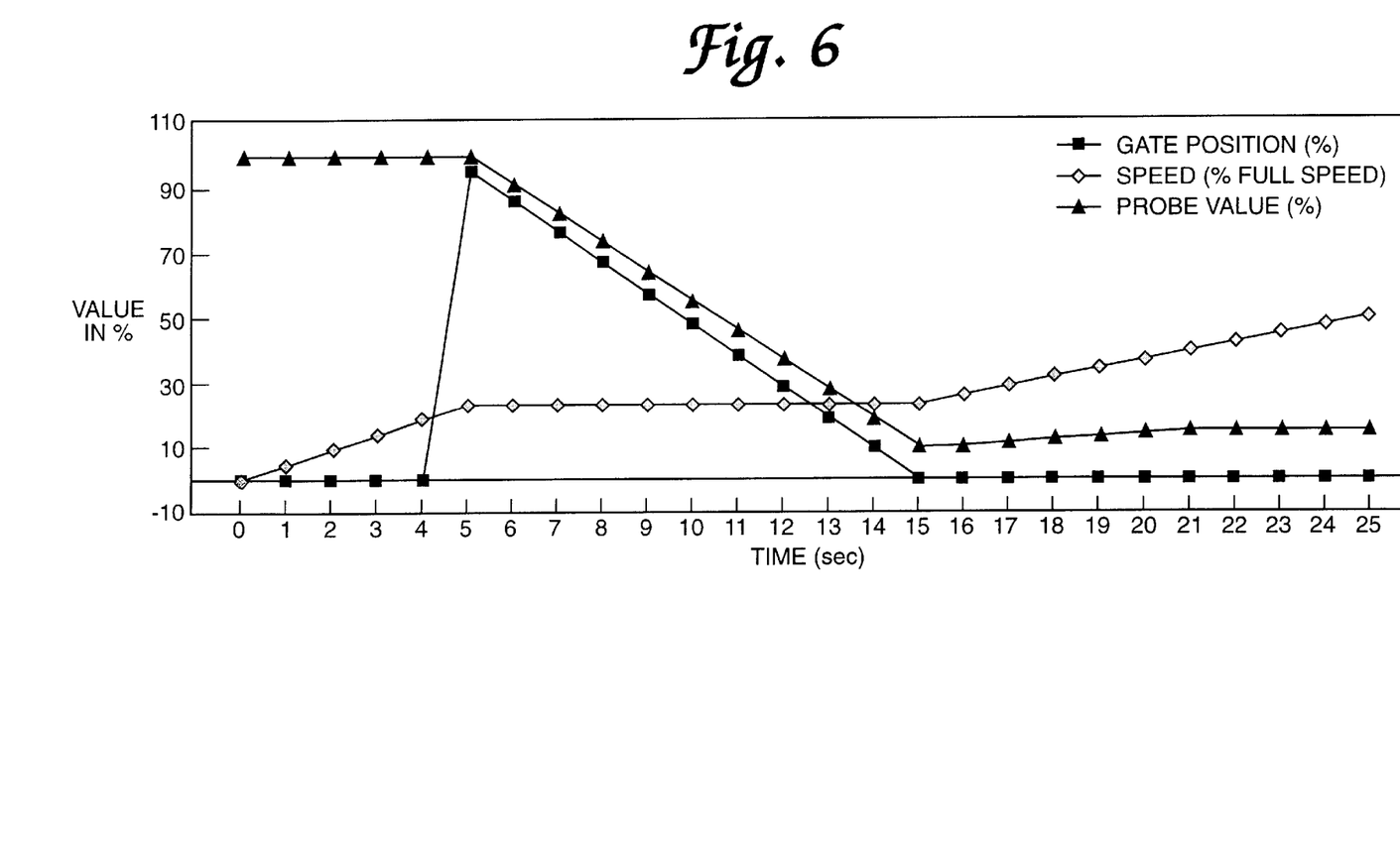
FIG. 6 depicts the loading cycle and adjustment according to this invention.

The machine cycle of the invention is described with reference to FIG. 6 and the following table.

| Function | Machine Speed in RPM | Time in Seconds | Probe Value in % | Gate Position in % Open | Gate Position Maximum in % Open** | Full Basket Value in % | Gate Air Solenoids |
| --- | --- | --- | --- | --- | --- | --- | --- |
| Start | 0 | 0 | 100 | 0 | 95 | 90 | off |
| Begin Loading | 280* | 5 | 100 | 95 | 95 | 90 | on |
| Mid-point of Loading | 280 | 7 | 50 | 47.5 | 95 | 90 | on |
| End of Loading | 280 | 15 | 10 | 0 | 95 | 90 | off |
| Mid-point of Acceleration | 600 | 25 | 15 | 0 | 95 | 92 | off |

*This value may vary according to the material being processed.
**These values are operator adjustable from 0 to 100%.

First the machine cycle is initialized and the basket speed is increased to loading speed. This loading speed may range from 75 to 500 rpm depending on the type of material to be processed. A signal is given to the gate that all safety precautions have been met and the machine is ready to be loaded. The gate is then opened to a preset value using a standard gate positioner.

The gate full open position is set prior to the first cycle after a set time of being non-operational. This allows the self adjusting portion of the invention to have a basis for the first cycle with a material of an unknown viscosity. As the raw material is introduced, the probe 30 senses an increasing level and closes the input valve a proportionate amount. This allows the flow rate to be faster when the basket 18 is empty and slower as the basket fills. Preferably the control of the gate position should be fully analog in order to maximize the amount of raw material in the basket 18. However, digital control of the gate position is acceptable.

Analog control of the gate position continues until the basket 18 has reached full capacity as determined by the probe 30. At this time, the machine is accelerated to full speed as the remainder of the cycle is carried out. During the acceleration of the machine, the probe 30 repeatedly (continuously) checks the actual amount of raw material in the machine. Adjustments are made for too much raw material, too little material or extended loading time. The PLC 38 then adjusts the gate open position, the flow rate into the machine or the final wall thickness in order to maintain the maximum load in the machine.

Variations on the above-described preferred embodiments of this invention will be readily apparent to those skilled in the art. For example, as noted above, the present invention may be used not only to control affination centrifuges, but can be used in other phases of the refining process as well. For example, the invention can be used in a white sugar centrifuge with little modification. Also, the invention is not limited to food refining applications, rather, it can be used in any application where dynamic motor braking is effective. For example, the invention may be implemented in sawmills and the like. Still further, the invention can be used in any device or situation for determining the thickness of any kind of material, and is not limited to materials that are in a rotating machine or on a belt.

Although described with reference to a particular system, the present invention operates on any centrifuge system and the computer aspects of it can be implemented in software, hardware or any combination thereof. When implemented fully or partially in software, the invention can reside, permanently or temporarily, on any memory or storage medium, including but not limited to a RAM, a ROM, a disk, an ASIC, a PROM and the like.

Thus, an ultrasonic loading and control system and method are provided. One skilled in the art will appreciate that the present invention can be practiced by other than the described embodiments, which are presented for purposes of illustration and not limitation, and the present invention is limited only by the claims that follow.

What is claimed is:

1. A centrifuge comprising:
   a basket disposed in a housing;
   means for loading into the basket a raw material containing particulate matter to be extracted from the material;
   an ultrasonic probe disposed outside the housing and operable for producing and receiving sound waves and for producing an electronic signal for controlling the loading means; and
   a sound tube disposed in the basket and connected to the ultrasonic probe for transmitting sound waves from the probe into the basket and for returning reflected sound waves back to the ultrasonic probe.

2. A centrifuge as in claim 1 wherein the sound tube has a reflector disposed on an end thereof.

3. A centrifuge as in claim 2 wherein the reflector is mounted at an angle of about 45 degrees relative to a wall of the basket and the probe.

4. A centrifuge comprising:
   a basket disposed in a housing;
   means for loading into the basket a raw material containing particulate matter to be extracted from the material;
   an ultrasonic probe disposed outside the housing and producing an electronic signal for controlling the loading means; and
   a sound tube disposed in the basket and connected to the ultrasonic probe for transmitting sound waves from the probe into the basket and for returning reflected sound waves back to the ultrasonic probe,
   wherein the sound tube has a reflector disposed on an end thereof, and wherein the sound tube is adjustable so as to maximize reflected sound waves by an adjustment of the angle at which the sound waves are reflected from a wall of particulate matter on the inside of the basket.

5. A centrifuge as in claim 1 wherein the raw material is massecuite.

6. A centrifuge as in claim 4 wherein the raw material is massecuite and wherein the particulate matter is sugar.

7. A device for controlling a flow rate of a raw material into a basket of a centrifuge, the raw material containing particulate matter to be extracted from the material, the device comprising:
   a loading means for loading raw material into a basket of a centrifuge;
   an ultrasonic probe disposed outside a housing of the centrifuge and operable for producing and receiving sound waves and for producing an electronic signal for controlling said loading means; and
   a sound tube disposed in the basket and connected to the ultrasonic probe for transmitting sound waves from the probe into the basket and for returning reflected sound waves back to the ultrasonic probe.

8. A device as in claim 7 wherein the sound tube has a reflector disposed on an end thereof.

9. A device as in claim 8 wherein the reflector is mounted at an angle of about 45 degrees relative to a wall of the basket and the ultrasonic probe.

10. A device as in claim 7 wherein the sound tube is adjustable so as to maximize reflected sound waves by an adjustment of the angle at which the sound waves are reflected from a wall of particulate matter on the inside of the basket.

11. A device as in claim 10 wherein the raw material is massecuite and wherein the particulate matter is sugar.

12. A device as in claim 7 wherein the raw material is massecuite.

13. A method of extracting a particulate substance from a raw material using a centrifuge, the raw material containing particulate matter to be extracted from the material, the method comprising:
   loading an amount of the raw material into a basket of the centrifuge;
   rotating the basket so that the particulate substance is extracted from the raw material to form a wall on an inside of the basket;
   determining a thickness of the wall in a non-contact manner using an ultrasonic probe disposed outside the basket and connected to a sound tube disposed inside the basket, said ultrasonic probe transmitting sound waves into the basket and receiving sound waves returned through the sound tube; and
   controlling the amount of raw material loaded into the basket based on the determined thickness of the wall.

14. A method as in claim 13 further wherein the controlling of the amount of raw material comprises controlling a loading gate of the centrifuge based on the determined thickness.

15. A method as in claim 14 wherein the loading gate is controlled repeatedly.

16. A method as in claim 14 wherein the position of the loading gate is inversely proportional to the determined thickness.

17. A method as in claim 13 wherein the raw material is massecuite and wherein the particulate matter is sugar.

18. A centrifuge device comprising:
   a basket disposed in a housing;
   a loading gate for loading a raw material into the basket, the raw material containing particulate matter to be extracted from the material;
   an ultrasonic probe disposed outside the housing and operable for producing and receiving sound waves and for producing an electronic signal for controlling the loading means;

a sound tube disposed in the basket and connected to the ultrasonic probe for transmitting sound waves from the probe into the basket and for returning reflected sound waves back to the ultrasonic probe; and a programmable logic controller (PLC) programmed to effect:
  determining a thickness of a wall formed in the basket using the ultrasonic probe; and
  controlling the amount of raw material loaded into the basket based on the determined thickness of the wall.

19. A device as in claim 18 wherein the sound tube has a reflector disposed on an end thereof.

20. A device as in claim 19 wherein the reflector is mounted at an angle of about 45 degrees relative to a wall of the basket and the ultrasonic probe.

21. A device as in claim 18 wherein the raw material is massecuite.

22. A centrifuge device comprising:

a basket disposed in a housing;

a loading gate for loading a raw material into the basket, the raw material containing particulate matter to be extracted from the material;

an ultrasonic probe disposed outside the housing and producing an electronic signal for controlling the loading means;

a sound tube disposed in the basket and connected to the ultrasonic probe for transmitting sound waves from the probe into the basket and for returning reflected sound waves back to the ultrasonic probe; and a programmable logic controller (PLC) programmed to effect:
  determining a thickness of a wall formed in the basket using the ultrasonic probe; and
  controlling the amount of raw material loaded into the basket based on the determined thickness of the wall, wherein the sound tube is adjustable so as to maximize reflected sound waves by an adjustment of the angle at which the sound waves are reflected from a wall of particulate matter on the inside of the basket.

23. A device as in claim 22 wherein the raw material is massecuite and wherein the particulate matter is sugar.

24. A centrifuge comprising:

a basket disposed in a housing;

means for loading massecuite into the basket;

an ultrasonic probe disposed outside the housing and producing an electronic signal for controlling the loading means; and a sound tube disposed in the basket and connected to the ultrasonic probe for transmitting sound waves from the probe into the basket and for returning reflected sound waves back to the ultrasonic probe, wherein the sound tube has a reflector disposed on an end thereof, the reflector is mounted at an angle of about 45 degrees relative to a wall of the basket and the probe, the tube being adjustable so as to maximize reflected sound waves by an adjustment of the angle at which the sound waves are reflected from a wall of sugar on the inside of the basket.

* * * * *